Aug. 16, 1938.  D. W. BURT  2,126,946
SAFETY DEVICE FOR AUTOMOBILES
Filed June 15, 1937
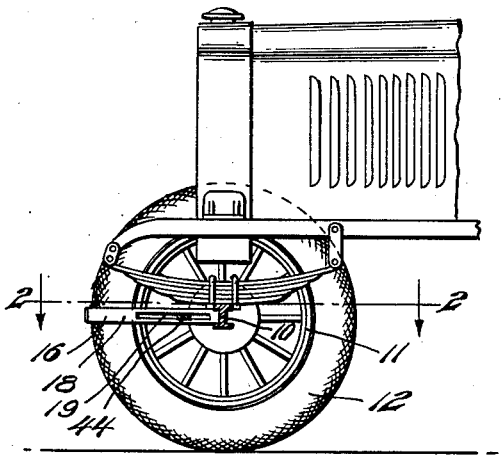
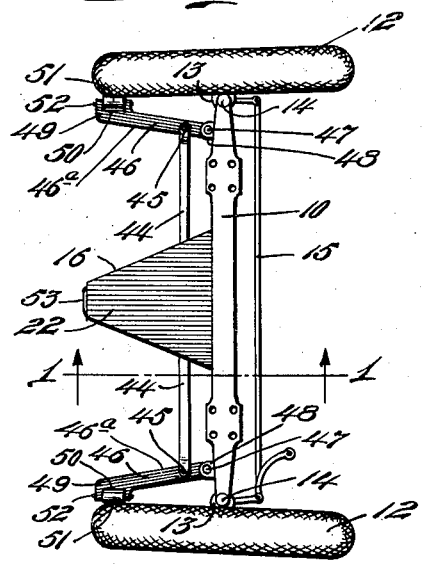
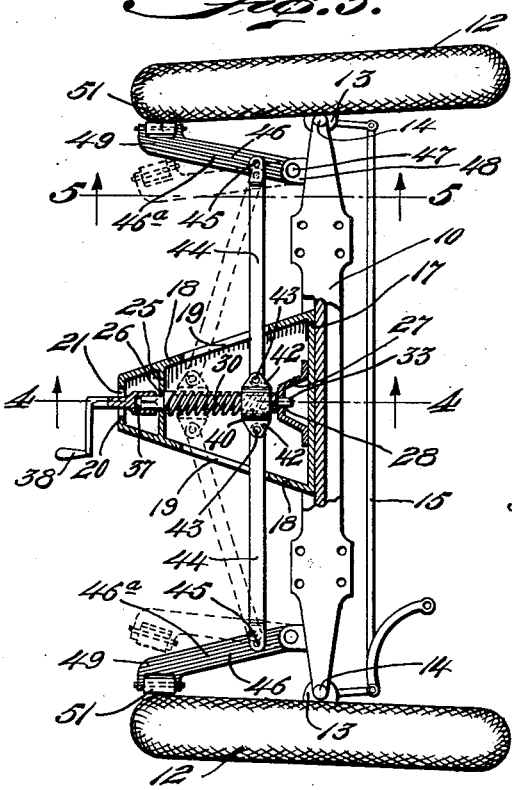
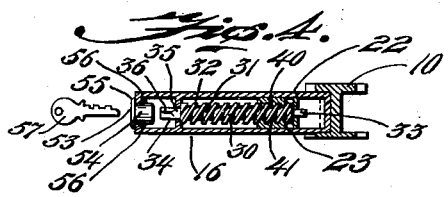
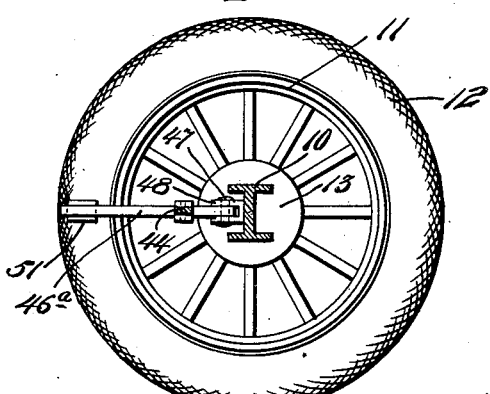
Inventor
Daniel W. Burt
By Horatio E. Bellows
Attorney Patented Aug. 16, 1938

2,126,946

UNITED STATES PATENT OFFICE 2,126,946

SAFETY DEVICE FOR AUTOMOBILES

Daniel W. Burt, Providence, R. I.

Application June 15, 1937, Serial No. 148,334

7 Claims. (Cl. 280—87)

This invention relates to improvements in devices for preventing the unauthorized or unlawful removal of automobiles and similar vehicles.

The essential objects of the invention are to prevent any transverse swing or steering movement of the front automobile wheels while my device is in set or protective position, and at the same time permitting rotation of the wheels whereby injury to the tires by frictional resistance to the ground or otherwise is avoided; to guard against the unauthorized release of the mechanism from the set position; and to prevent tampering with the operative parts.

Additional objects are to effect these ends in an inexpensive structure, facile to operate, and to embody in automobiles of various types.

With the above and other advantageous features and objects in view my invention consists in the novel construction and arrangement of parts more fully disclosed in the detailed description following in conjunction with the accompanying drawing, and more specifically defined in the appended claims.

In the drawing,

Figure 1 is a fragmentary side elevation, partially in section on line 1—1 of Figure 2, of an automobile in which my invention is embodied, Figure 2 is a plan view of my device taken on the line 2—2 of Figure 1, Figure 3, a similar view of the same showing the housing and enclosed parts in horizontal central section, and with the crank member applied, Figure 4, a section taken on line 4—4 of Figure 3, with the handle member removed, the locking member applied, and the lock key shown, and Figure 5, a section taken on line 5—5 of Figure 3.

Like reference characters indicate like parts throughout the views.

10 represents the front axle, 11 the wheels, 12 the wheel tires, 13 the wheel hubs, 14 the axle pivot pins, and 15 the tie rod of an automobile of any usual or preferred construction. It is in conjunction with these familiar parts that my device is herein described.

The latter includes a casing 16 comprising a rear wall 17 fixed by brazing or otherwise to axle 11, forwardly directed side walls 18 inwardly tapering towards their front ends and provided intermediate their lengths with elongated slots 19, a front wall 20 provided with a central circular opening 21, and top and bottom walls 22 and 23 respectively. A cross piece or partition 25 fast to the side walls forwardly of the slots has a central bearing opening 26, and a bracket or standard 27 fixed to the rear wall has a central bearing opening 28 in longitudinal alignment with the opening 26 and with the opening 21.

Mounted in the openings of the bearing members or brackets 25 and 28 is an operating screw 30 comprising a body 31 having a lateral screw thread 32, a cylindrical pin 33 upon its inner end registering in the opening 28, and a pin 34 in its outer end having its rear portion 35 cylindrical to rotatably fit in the bearing opening 26, and having its outer portion 36 polygonal, and adapted to slidably fit in the angular socket 37 of a hand crank 38 as shown in Figure 3.

A collar 40 has an internal screw thread 41 loosely interengaging the thread 32 of the driving or operating screw upon which the collar travels when the operating screw is rotated. To oppositely disposed ears 42 upon the collar are pivoted by pins 43 the inner ends of bracing or clamping rods 44, which pass through the slots 19, and whose outer ends are pivoted by pins 45 to the shank portions 46 of levers 46ª whose inner ends are pivoted by pins 47 to lugs 48 fixed to or integral with the axle near its ends. The free end portions 49 of the levers are laterally directed at an angle to their shank portions, and their ends provided with recesses 50 to receive anti-friction rollers 51 upon pintles 52 fixed in the arm portions 49 adjacent the recesses.

When the crank 38 is removed from operating engagement, access to the interior of the housing is prevented, as shown in Figure 4, by mounting in the housing opening 21 a locking member 53 of the type common on the market, which includes a barrel 54, a bearing flange 55, and a plurality of lugs 56 movable radially of the barrel by a key 57.

The operation of my device is as follows. After removing the locking member 53 the crank 38 is engaged with the angular end 36 of the operating screw 30, as shown in Figure 3, and rotated in a direction to cause the collar 40 to move rearwardly from its broken line position and bring the rods 44 into approximate alignment with each other thereby pressing the rollers 51 in contact with the sides of the tires 12. While in this engaged or clamped position of the parts the wheels are rotatable, but the automobile is movable in a straight line only, and thus cannot be stolen.

Not only does my device prevent transverse movement of the wheels, but they are permitted to rotate, and thus the tires can under no circumstances be torn or worn by friction with the ground. The anti-friction rollers prevent any possible wear upon the tires by their contact therewith.

After the parts are clamped as described, the operator withdraws the crank and returns the locking member 53 to the opening 21, rendering access to the operating screw impossible.

I claim:—

1. In an automobile having an axle, wheels, and tires on the wheels, the combination of a housing fixed at one end to an intermediate portion of the axle and provided with lateral slots, a screw member rotatably supported in the housing, a collar loosely mounted upon the screw member, levers pivotally attached to the axle and movable to and from the tires, and bracing rods upon the collar extending through the slots engaging intermediate portions of the levers.

2. In an automobile having an axle, wheels, and tires on the wheels, the combination of a horizontal housing mounted upon the axle, a driving screw member supported in the housing, a screw threaded collar engaged by said member and driven thereby, levers pivotally attached at the inner ends to the axle adjacent the wheels and movable to and from the tires, and rods pivotally connecting the collar to intermediate portions of the levers.

3. In an automobile having an axle, wheels, and tires on the wheels, the combination of levers pivotally attached to the axle adjacent the wheels, rollers upon the free ends of the levers engageable with the tires, a housing in the plane of the levers fixed at one end to the axle, bearings in the housing, a driving screw member rotatably mounted in the bearings, a collar loosely threaded upon said screw member, and rods connecting the collar and intermediate portions of the levers.

4. In an automobile having an axle, wheels, and tires on the wheels, the combination of levers comprising shanks attached at their inner ends to the axle adjacent the wheels, free end portions disposed at an angle to the shanks, and rollers mounted in the extremities of the free end portions and engageable with the tires, a housing upon the axle intermediate the levers and provided with lateral slots, a screw member rotatably mounted in bearings in the housing, a collar in threaded engagement with the screw member and actuated thereby, and rods upon the collar extending through the slots and engaging the shanks of the levers.

5. In an automobile having an axle, wheels on the axle, and tires on the wheels, the combination of levers pivotally attached at their inner ends to the axle adjacent the wheels and movable to and from the tires, a housing in the plane of the levers fixed at one end to the axle between the levers provided with lateral slots and with an opening in its free end, bearings fixed in the housing, a driving screw member rotatably mounted in the bearings in alignment with the opening, a collar mounted on the screw member in loosely threaded engagement therewith, bracing rods pivotally connecting the collar with intermediate portions of the levers, said driving screw adapted to be operated by a removable or detachable crank.

6. In an automobile having a front axle, wheels on the axle, and tires on the wheels, the combination of levers pivotally attached at their inner ends to the axle adjacent the wheels and movable to and from the tires, a housing in the plane of the levers fixed at one end to the axle between the levers provided with lateral slots and with an opening in its free end, bearings fixed in the housing, a driving screw member rotatably mounted in the bearings in alignment with the opening, a collar mounted on the screw member in loosely threaded engagement therewith, and bracing rods pivotally connecting the collar with intermediate portions of the levers.

7. In a safety device of the type set forth, the combination with the axle and tires of an automobile, of levers pivotally mounted at their ends to the axle and including at their free ends anti-friction rollers, and movable into and out of contact with the tires, a housing attached at one end to the axle between the tires and provided with lateral slots, and with an opening in its unattached end, a driving screw member rotatably mounted in the housing longitudinally thereof, a driven screw member slidably mounted upon the driving member, rods extending through the slots and connecting the driven member with intermediate portions of the levers, and means for actuating the driving member.

DANIEL W. BURT.